United States Patent Office 3,137,722
Patented June 16, 1964

3,137,722
β-(o-CARBOXYBENZYLMERCAPTO)
PROPIONITRILE
William G. Toland, Jr., San Rafael, Calif., assignor to California Research Corporation, San Francisco, Calif., a corporation of Delaware
No Drawing. Filed June 9, 1961, Ser. No. 115,933
1 Claim. (Cl. 260—465)

The present invention is directed to the new compounds represented by the structural formula

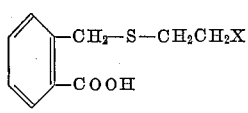

wherein X is a —CN or —COOH group.

The new nitrile compound of the invention, namely, β-(o-carboxybenzylmercapto)propionitrile, is obtained in the form of a white solid. It is soluble in ether, methanol, ethanol, and hot benzene.

On the other hand, the hydrolysis derivative of the foregoing compound, namely, the dibasic acid β-(o-carboxybenzylmercapto)propionic acid, is obtained as colorless blades from ethyl acetate. It can be crystallized as fine needles from H$_2$O. It separates as an amorphous solid from toluene. It is very soluble in methanol, ethanol, and ether. In acetic acid it is soluble to the extent of 10 g./100 cc. at 25° C. On the other hand, it is insoluble in chloroform, benzene, and n-heptane.

The foregoing compounds are useful as chemical intermediates in the preparation of polymers and plasticizers, as softening, swelling, or gelatinizing agents for synthetic resins, and as corrosion inhibitors in lubricating oils.

This application is a continuation-in-part of my copending application Serial No. 27,485, filed May 9, 1960, now abandoned.

The nitrile compound, represented by the structural formula,

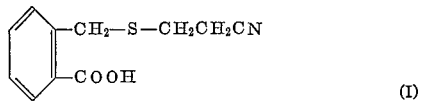

can be prepared from the reaction of acrylonitrile with sodium o-mercaptomethylbenzoate as follows:

Thiophthalide (50 g., 0.33 mol) was hydrolyzed to sodium o-mercaptomethylbenzoate by stirring one hour with 46.4 g. (1.16 mols) of sodium hydroxide in 200 ml. of water at 80° C. The solution was cooled to 40° C. and 26.3 g. (0.495 mol) of acrylonitrile were added in 30 minutes, cooling as necessary to maintain the temperature at 40° C. Stirring was continued for an additional 1.75 hours at 40° C. The mixture was then cooled in ice and acidified with 150 ml. (1.8 mols) of concentrated hydrochloric acid. The gummy solid that separated was filtered off (74.3 g.). It consisted of approximately equal amounts of β-(o-carboxybenzylmercapto)propionitrile and its hydrolysis product β-(o-carboxybenzylmercapto)propionic acid of the structural formula

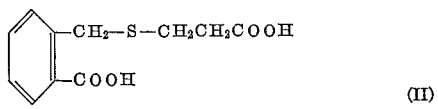

When this mixture was recrystallized with benzene, the first crop of crystals (56.6 g.) still was a mixture of these compounds; M.P. 102° to 113° C.; neutral equivalent 162 (theory for β-(o-carboxybenzylmercapto)propionitrile, 221.3; for β-(o-carboxybenzylmercapto)propionic acid, 120.1). The mother liquors were concentrated by boiling off part of the solvent. Allowing the concentrate to cool gave a second crop of crystals (9.3 g.), M.P. 92.4° to 93.7° C., neutral equivalent 213.3. Recrystallizing this fraction gave pure β-(o-carboxybenzylmercapto)propionitrile. Additional pure product was recovered by fractional extraction and crystallization of the first crop of crystals using benzene and ethanol solvents.

As will occur to those skilled in the art, the undesired partial hydrolysis of the product which reduces the yield of the desired nitrile and complicates its purification can be minimized by using a lower reaction temperature, lower base concentrations and shorter reaction times.

The product, a fine white powder, had a melting point of 94.2° to 95.8° C. and analyzed as follows:

|  | C | H | N | Neutral Equiv. |
|---|---|---|---|---|
| Calculated | 59.71 | 5.01 | 6.33 | 221.27 |
| Found | 59.25; 59.39 | 4.89; 4.90 | 5.80; 5.87 | 217.8 |

β-(o-carboxybenzylmercapto)propionic acid, in addition to its preparation by hydrolysis of the corresponding nitrile as above indicated, was also prepared by the addition of acrylic acid to sodium o-mercaptomethylbenzoate as follows:

Thiophthalide (50.0 g., 0.33 mol) was hydrolyzed to sodium o-mercaptomethylbenzoate by stirring one hour with 46.4 g. (1.16 mols) of sodium hydroxide dissolved in 200 ml. of water at 80° C. The solution was cooled to 40° C. and 35.7 g. (0.495 mol) of acrylic acid added in 30 minutes, cooling as necessary to maintain the temperature at 40° C. Conversion of o-mercaptomethylbenzoic acid, from iodine titration of an aliquot, was 96.6% in 17 minutes after the acrylic acid addition was completed. Stirring was continued without heating for an additional 1.5 hours. Conversion was 99.8%. Product acid was precipitated with 150 ml. (1.8 equivalents) of 12 N hydrochloric acid. Recrystallization from ethyl acetate, with Norita "A" decolorization, gave 73.3 g. of pure β-(o-carboxybenzylmercapto)propionic acid, M.P. 138.3° to 139.0° C. (92% of theory, based on thiophthalide charged).

The product analyzed as follows:

|  | C | H | S | Neutral Equiv. |
|---|---|---|---|---|
| Calculated | 54.98 | 5.04 | 13.34 | 120.1 |
| Found | 55.20; 55.43 | 4.82; 4.90 | 13.1; 13.3 | 122.0; 121.8 |

A mixed melting point of the product obtained from this preparation and hydrolysis product in making the nitrile showed the materials to be identical.

The hexamethylenediamine salt of the above acid was prepared by dissolving the acid in an equivalent amount of diamine dissolved in a little water. The solution was concentrated in vacuo and the salt recrystallized from ethanol-water. Analyses indicate that the salt was obtained as the monohydrate. The salt was obtained as coarse, colorless needles from ethanol and water. It is very soluble in water and slightly soluble in ethanol. Further, the salt partially melts at 125° to 127° C., and at 165° C. gas evolution begins.

The following are the analyses on the salt:

|  | C | H | N | S |
|---|---|---|---|---|
| Calculated | 54.52 | 8.08 | 7.48 | 8.56 |
| Found | 54.65; 54.42 | 7.65; 7.85 | 7.6; 7.7 | 8.17; 8.10 |

To illustrate the utility of the compounds herein claimed, the following test was performed, showing their effectiveness as corrosion inhibitors in a lubricating oil.

A copper and a lead strip approximately one inch by three inches are immersed in the test oil at 340° F. The oil is stirred at 1,050 r.p.m. After 20 hours the copper and lead strips are removed, rinsed with hexanes, and wiped with a clean rag. The weight loss of the copper and lead strips is determined. The following weight losses are reported: (a) copper; (b) copper, after it has additionally been washed in 20 percent KCN solution, rinsed with water and acetone, dried and reweighed; (c) lead.

For the test, the reference oil was a solvent-refined paraffinic neutral oil having a refractive index of 1.4858, a viscosity at 100° F. of 528 SSU and 230 SSU at 130° F., an aniline point of 238, an average molecular weight of 430, and a mid-boiling point of 480° F. at a pressure of 1 mm. Hg. The oil contained about 3 weight percent of a corrosive lube oil detergent, polyisobutenylsuccinimide of tetraethylenepentamine. This oil is commercially available for diesel engine lubrication.

The results of the test are tabulated below:

| Composition | Weight Loss in Milligrams | | |
|---|---|---|---|
|  | (a) Copper | (b) Copper after KCN | (c) Lead |
| Reference Oil | 21.1 | 24 | 1,583.9 |
| Reference Oil+0.15% Compound I (Nitrile) | 6.8 | 14.7 | 68 |
| Reference Oil+0.15% Compound II (Acid) | 6.7 | 11.2 | 1,373.9 |

The smaller the number in the table, the less metal that is removed by corrosion. In the above table, both Compounds I and II show about the same inhibition of copper corrosion. The weight loss on copper is about one-third to one-half that of the non-inhibited oil. In the case of lead corrosion Compound I is particularly effective.

I claim:

β-(o-Carboxybenzylmercapto)propionitrile.

References Cited in the file of this patent

UNITED STATES PATENTS 1,762,719    Hoffa et al.    June 10, 1930
3,069,457    Lynn et al.    Dec. 18, 1962

FOREIGN PATENTS 959,012    Germany    Feb. 28, 1957

OTHER REFERENCES

Petropoulos et al.: J.A.C.S., 75, 1133 (1953).